(12) United States Patent
McGuire et al.

(10) Patent No.: US 11,391,323 B2
(45) Date of Patent: Jul. 19, 2022

(54) SPHERICAL PLAIN BEARING FOR DAMPERS

(71) Applicant: Roller Bearing Company of America, Inc., Oxford, CT (US)

(72) Inventors: Jarrod McGuire, Murrieta, CA (US); Travis Gipson, Fullerton, CA (US); Brian Rowe, Jr., New Milford, CT (US); Bradley Smith, Glastonbury, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 17/230,469

(22) Filed: Apr. 14, 2021

(65) Prior Publication Data

US 2021/0231165 A1   Jul. 29, 2021

Related U.S. Application Data

(63) Continuation of application No. 16/712,047, filed on Dec. 12, 2019, now Pat. No. 11,009,063.

(60) Provisional application No. 62/824,705, filed on Mar. 27, 2019, provisional application No. 62/778,517, filed on Dec. 12, 2018.

(51) Int. Cl.
*F16C 23/08* (2006.01)
*F16C 23/04* (2006.01)
*F16C 11/06* (2006.01)

(52) U.S. Cl.
CPC ........ *F16C 23/043* (2013.01); *F16C 11/0628* (2013.01); *F16C 11/0652* (2013.01); *F16C 23/084* (2013.01); *F16C 2202/52* (2013.01)

(58) Field of Classification Search
CPC .............. F16C 11/0628; F16C 11/0633; F16C 11/0638; F16C 11/0647; F16C 23/043; F16C 2361/53; E04F 9/0215
See application file for complete search history.

(56) References Cited

U.S. PATENT DOCUMENTS

| 2,827,340 | A | * | 3/1958 | Johnson | ................ | F16C 23/045 |
|---|---|---|---|---|---|---|
| | | | | | | 384/209 |
| 2,944,831 | A | * | 7/1960 | Thomas | ................. | B60G 7/005 |
| | | | | | | 280/86.756 |
| 3,507,527 | A | | 4/1970 | White | | |
| 3,744,859 | A | | 7/1973 | Ringel | | |
| 3,922,040 | A | | 11/1975 | Carter | | |
| 4,295,689 | A | | 10/1981 | Licht | | |
| 4,917,211 | A | | 4/1990 | Yamada et al. | | |
| 6,179,468 | B1 | | 1/2001 | Thorstens et al. | | |
| 7,682,117 | B2 | | 3/2010 | Holt et al. | | |
| 8,282,305 | B2 | | 10/2012 | Rechtien et al. | | |
| 9,926,972 | B2 | | 3/2018 | McGuire et al. | | |

(Continued)

FOREIGN PATENT DOCUMENTS

| CN | 203499047 U | 3/2014 |
|---|---|---|
| CN | 106968499 B | 7/2017 |

(Continued)

*Primary Examiner* — Phillip A Johnson
(74) *Attorney, Agent, or Firm* — Murtha Cullina LLP

(57) ABSTRACT

A spherical bearing for a damper system includes a first segment and a second segment with a ball therebetween. The ball includes a shaft extending therefrom. The shaft extends out of the first segment. A lubricious liner is disposed between the first segment and the second segment.

17 Claims, 13 Drawing Sheets

(56) References Cited

U.S. PATENT DOCUMENTS

| | | | |
|---|---|---|---|
| 10,005,641 B2 | 6/2018 | Smith | |
| 2017/0108034 A1* | 4/2017 | McGuire | ............ F16C 11/0652 |
| 2017/0108037 A1 | 4/2017 | Hestermann et al. | |

FOREIGN PATENT DOCUMENTS

| | | |
|---|---|---|
| CN | 208792142 | 4/2019 |
| CN | 109750889 A | 5/2019 |
| CN | 109778674 A | 5/2019 |
| CN | 109853766 A | 6/2019 |
| DE | 3301543 A1 | 7/1984 |
| EP | 373995 B1 | 6/1990 |
| JP | 4504295 B2 | 5/2007 |
| JP | 4841404 B2 | 6/2008 |
| JP | 5390287 B2 | 2/2011 |
| JP | 5848554 B2 | 3/2013 |
| JP | 6053530 B2 | 7/2014 |
| JP | 6290059 B2 | 5/2016 |
| JP | 2017089337 A | 5/2017 |
| JP | 2018096389 A | 6/2018 |
| JP | 2018127875 A | 8/2018 |
| KR | 101370158 B1 | 3/2014 |
| RU | 2130135 C1 | 5/1999 |

\* cited by examiner

SPHERICAL PLAIN BEARING FOR DAMPERS

CROSS REFERENCE TO RELATED APPLICATIONS

This application is a continuation of and claims priority benefit to U.S. Nonprovisional patent application Ser. No. 16/712,047 filed on Dec. 12, 2019, which claims the benefit of U.S. Provisional Patent Application Ser. No. 62/778,517 filed on Dec. 12, 2018, and U.S. Provisional Patent Application Ser. No. 62/824,705 filed on Mar. 27, 2019, which are incorporated herein by reference in their entireties.

TECHNICAL FIELD

This invention relates to spherical plain bearings for use in dampers including features to minimize and adjust internal clearances thereby improving the performance and reliability of dampers and damper systems.

BACKGROUND

There has been a need to erect slender and tall high-rise buildings. Tall slender buildings are, by design and nature, more flexible than shorter buildings, allowing for more lateral movement in their upper stories. A building designed to resist all of these movements would be too large to be feasible for design and construction (e.g. a Pyramid). In order to reduce cost and weight, such buildings are known to incorporate light-weight materials. One disadvantage of using light-weight materials in slender buildings is that the buildings can become susceptible to vibrations. For example, long ceiling spans and other long structural members can vibrate at natural frequencies and exceed acceleration limits as a result of seismic loads, wind loads, and human induced loads. Such loads can lead to catastrophic structural failure of a building.

Tuned Mass Damper (TMD) systems are generally employed to reduce or eliminate gross oscillations of the building structure itself by providing structural damping. To some extent, TMDs can also be used to counteract vibrations in the buildings. The use of TMDs is preferred over increasing the structural mass because sufficient damping can be achieved with less mass using TMDs compared to simply increasing the structural mass.

TMDs typically include a mass suspended (e.g., near the top of the building) via cables and/or columns and coupled to the building structure via one or more damping systems. To operate effectively, the mass of the TMD must be allowed to move freely. However, frictional forces located at joints between components of the TMD can impede such movement thereby reducing the effectiveness of the TMD.

Prior art ball and socket bearings are generally small and typically are either designed to handle mostly radial loading or are designed with little misalignment capacity. Known products are typically spherical bearings that can accommodate significant misalignment about one plane but only minor misalignment about another plane. Other known devices allow for multi-axis misalignment but only in compressive loading scenarios.

Mass dampers are used to stabilize or eliminate motion caused by harmonic vibration and other forces. A tuned damper reduces the vibration of a system with a comparatively lightweight component so that the worst-case vibrations are less intense. Roughly speaking, practical systems are tuned to either move the main mode away from a troubling excitation frequency, or to add damping to a resonance that is difficult or expensive to damp directly. An example of the latter is a crankshaft torsional damper. Mass dampers are frequently implemented with a frictional or hydraulic component that turns mechanical kinetic energy into heat, like an automotive shock absorber. Viscous dampers often couple to the TMD mass to the building structure. These dampers rely on multi-axial rotation with relatively low friction values $\mu \leq 0.10$.

Generally, proper damper design is dependent on minimizing clearances within the damper system. Typical damper systems that include bearings often lack the ability to adjust naturally occurring bearing clearances due to tolerance stack up between assembled components. In prior art, journal or plain bearings consist of a shaft or journal which rotates freely in a supporting metal sleeve or shell. There are no rolling elements in these bearings. While the bearing design and construction may be relatively simple, tolerance stack ups can impede optimum performance by allowing too much movement in the system and causing the damper system in which the bearing is used to be inefficient or unreliable.

Based on the foregoing, there is a need to provide improved bearings to overcome the problems associated with fully reversing loads in tension and compression, fatigue, asymmetric loads, misalignment, and difficult assembly.

SUMMARY

There is disclosed herein a spherical bearing assembly for a damper assembly. The spherical bearing assembly includes a ball that has a spherical exterior surface and a shaft extending therefrom. The spherical bearing assembly includes an enclosure that has a first segment that has a first spherical interior surface, a first axial abutment surface and an axial facing opening. The first spherical interior surface defines a first interior area. The axial facing opening extends into the first interior area. The enclosure also includes a second segment that has a second spherical interior surface and a second axial abutment surface. The second spherical interior surface defines a second interior area. A lubricious liner is disposed between the enclosure and the ball. The ball is disposed in the first interior area and the second interior area with the shaft extending out of the opening.

In one embodiment, the second segment is removably secured to the first segment with the first axial facing surface abutting the second axial facing surface, such that the first spherical interior surface of the first segment axially restrains the ball from being pulled out through the opening.

In one embodiment, the lubricious liner includes woven fibers with PTFE in the form of at least one of powder, floc and fibers.

In one embodiment, the lubricious liner is bonded to a portion of the first spherical interior surface and/or a portion of the second spherical surface.

In one embodiment, the spherical bearing assembly also includes at least one alignment feature configured to align the first segment with the second segment.

In one embodiment, the at least one alignment feature includes a plurality of first holes extending axially inward from the first axial abutment surface, a plurality of second holes extending axially inward from the second axial abutment surface and a plurality of alignment pins. The first holes and the second holes are axially aligned with each other and one of the pins extends into a respective one of the first holes and an aligned one of the second holes.

In one embodiment, the spherical bearing assembly also includes a base secured to the second segment.

There is further disclosed herein a tuned mass damper system that includes a viscous damping device that has a first connector and a second connector. A shaft of a first spherical bearing assembly is connected to the first connector; and a shaft of a second spherical bearing assembly is connected to the second connector.

In one embodiment, the tuned mass damper system also includes a wedge assembly in fixed relation to the second segment.

In one embodiment, the second segment of the first spherical bearing assembly is secured to a dampening mass and the second segment of the second spherical bearing assembly is secured to a building structure.

In one embodiment, a spacer disposed between the first axial abutment surface and the second axial abutment surface. The spacer abuts the first axial abutment surface and the second axial abutment surface. A clearance adjustment assembly cooperates with the first segment and the second segment. The clearance adjustment assembly is configured to selectively adjust forces applied to the spacer by the first segment and the second segment to adjust clearance between the ball and the enclosure.

In one embodiment, the clearance adjustment assembly includes a threaded engagement between the first segment and the second segment.

In one embodiment, the first segment and the second segment are axially retained between a housing and a locking flange.

In one embodiment, the spacer is compressed between the first axial abutment surface and the second axial abutment surface by threadably torqueing a housing to a locking flange.

In one embodiment, the spherical bearing assembly also includes an anti-rotation device configured to engage a locking flange and a housing to prevent relative rotation therebetween.

DETAILED DESCRIPTION

Figure 1:
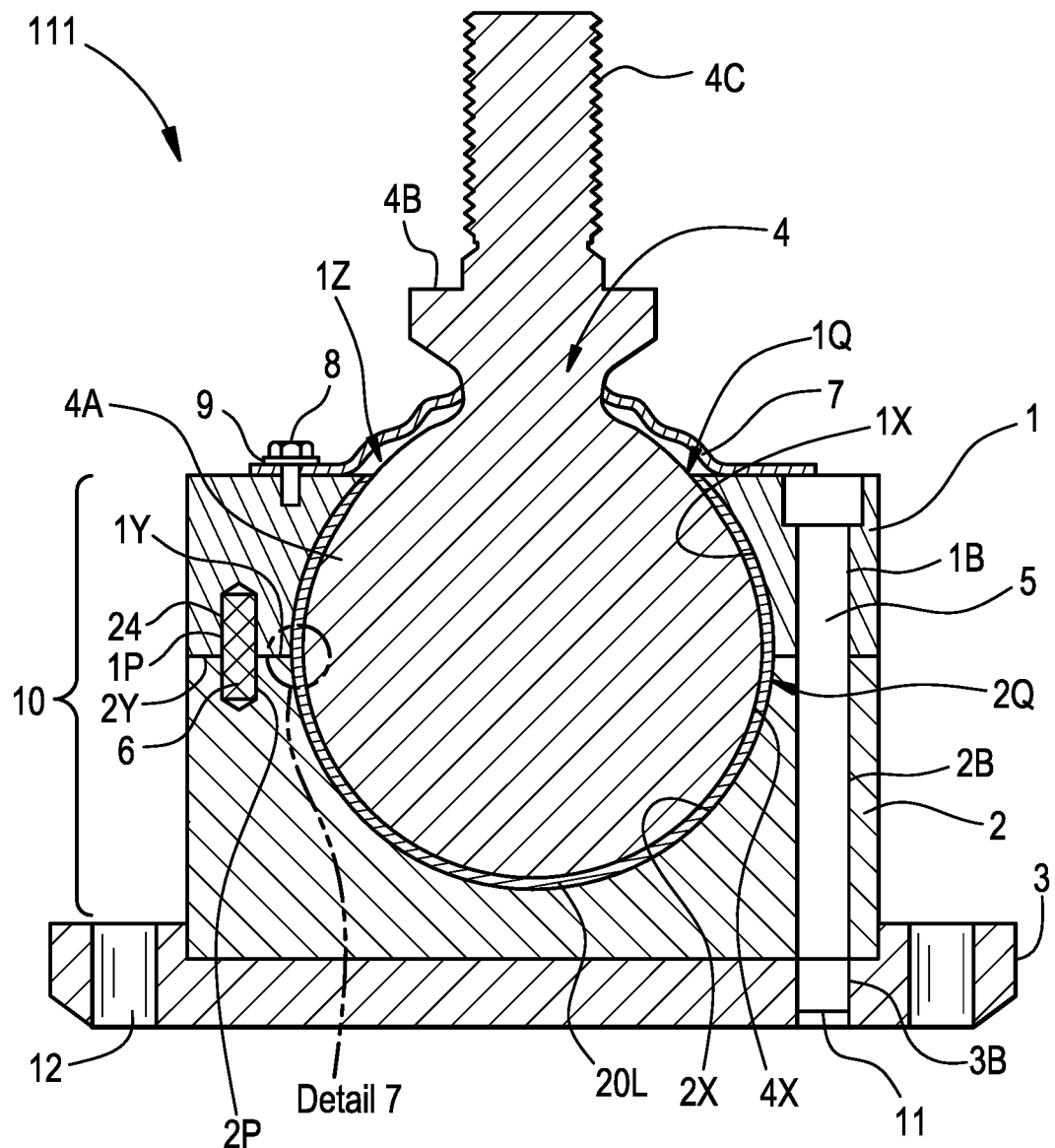
FIG. 1 is a cross sectional view of a non-limiting embodiment of a spherical bearing assembly in accordance with the disclosure.

Referring to FIGS. 1-7, a solid lubricated viscous damper end spherical bearing assembly 111 is depicted. The spherical bearing assembly 111 includes an enclosure 10 (e.g., a socket assembly) that has first segment 1 (e.g., an open segment or a retaining portion) that is removably secured to a second segment 2 (e.g., closed segment or a seating portion with a closed bottom). The spherical bearing assembly 111 is secured to a base 3 by suitable fasteners 5 (e.g., screws or bolts). The fasteners 11 extend through a bore 1B in the first segment 1 and a bore 2B in the second segment 2. A distal end of the fastener 5 is threaded into a female threaded area 3B in the base 3, to retain the second segment 2 between the first segment 1 and the base 3.

As shown in FIG. 1, the bearing assembly 111 includes a ball joint 4 that has a ball 4A (e.g., a spherical or spheroidal portion) and a shaft 4C (e.g., a fastening portion) extending from the ball 4A. An anvil portion 4B is formed on the shaft 4C adjacent to the ball 4A. The shaft 4C is configured with threads for attachment to a viscous damping device 204 of a tuned mass damper system 211 which can be connected to a building structure 206. The ball 4A has a spherical exterior surface 4X. The enclosure 10, including the first segment 1 and second segment 2, are fabricated from a structural material such a steel alloy, for example.

As shown in FIG. 1, the first segment 1 has a first spherical interior surface 1X, a first axial abutment surface 1Y and an axial facing opening 1Z. The first spherical interior surface 1X defines a first interior area 1Q and the axial facing opening 1Z extends into the first interior area 1Q. The second segment 2 has a second spherical interior surface 2X and a second axial abutment surface 2Y. The second spherical interior surface 2X defines a second interior area 2Q. The second spherical interior surface 2X forms a continuous cup shaped receiving area for the ball 4A.

As shown in FIG. 1, a lubricious liner 20L (e.g., a self-lubricating woven fabric liner) is disposed between the enclosure 10 and the ball 4A. The ball 4A is disposed in the first interior area 1Q and the second interior area 2Q with the shaft 4C extending out of the opening 1Z. The second segment 2 is removably secured to the first segment 1 with the first axial facing surface 1Y abutting the second axial facing surface 2Y, such that the first spherical interior surface 1X of the first segment 1 axially restrain the ball 4A from being pulled out through the opening 1Z.

As shown in FIG. 1, a protective boot 7 (e.g., an elastomeric annular seal, for example, neoprene) extends between the first segment 1 and the ball 4A to seal the opening 1Z. The protective boot 7 is secured to the first segment 1 with suitable fasteners 8 (e.g., bolts) and washers 9. An inner circumferential surface of the protective boot 7 slidingly and sealingly engages the ball 4A. The protective boot 7 is configured to prevent dust, dirt, or other contamination from entering the opening 1Z.

Figure 2:
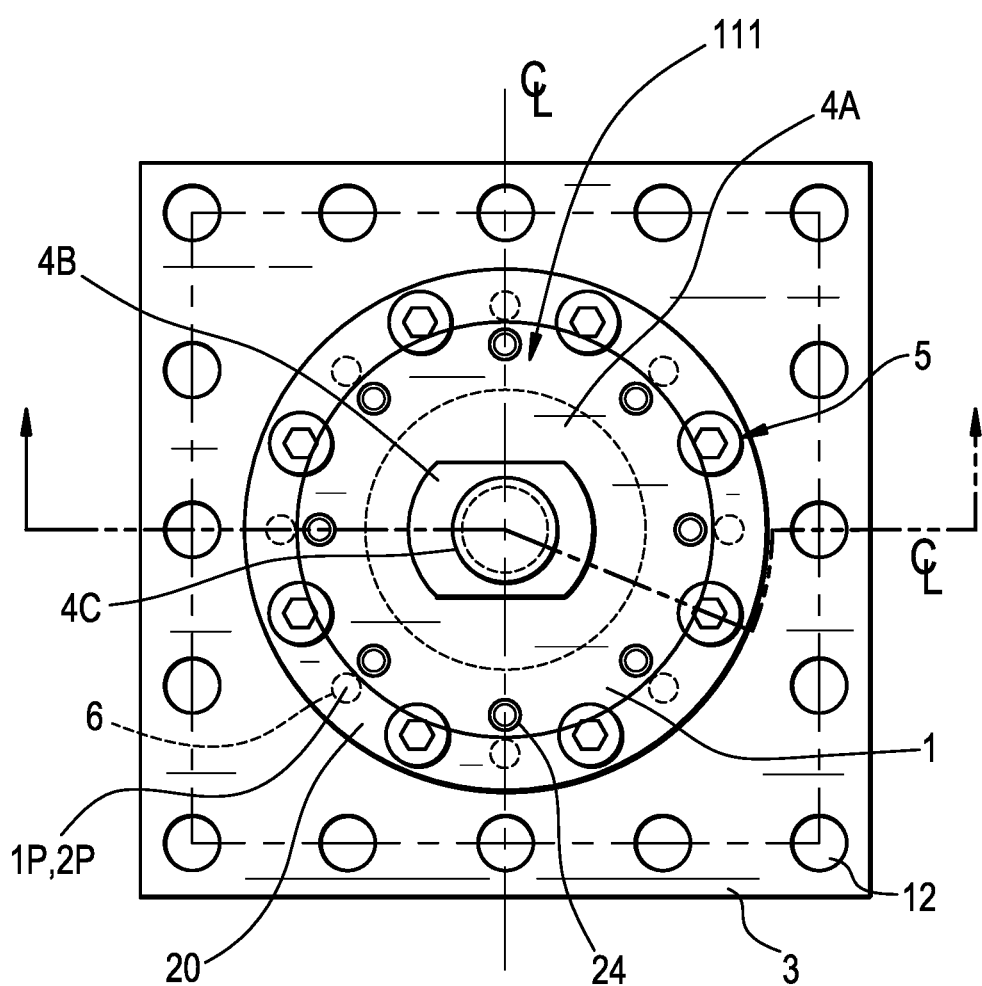
FIG. 2 is a top view of the spherical bearing assembly of FIG. 1.
Figure 3:
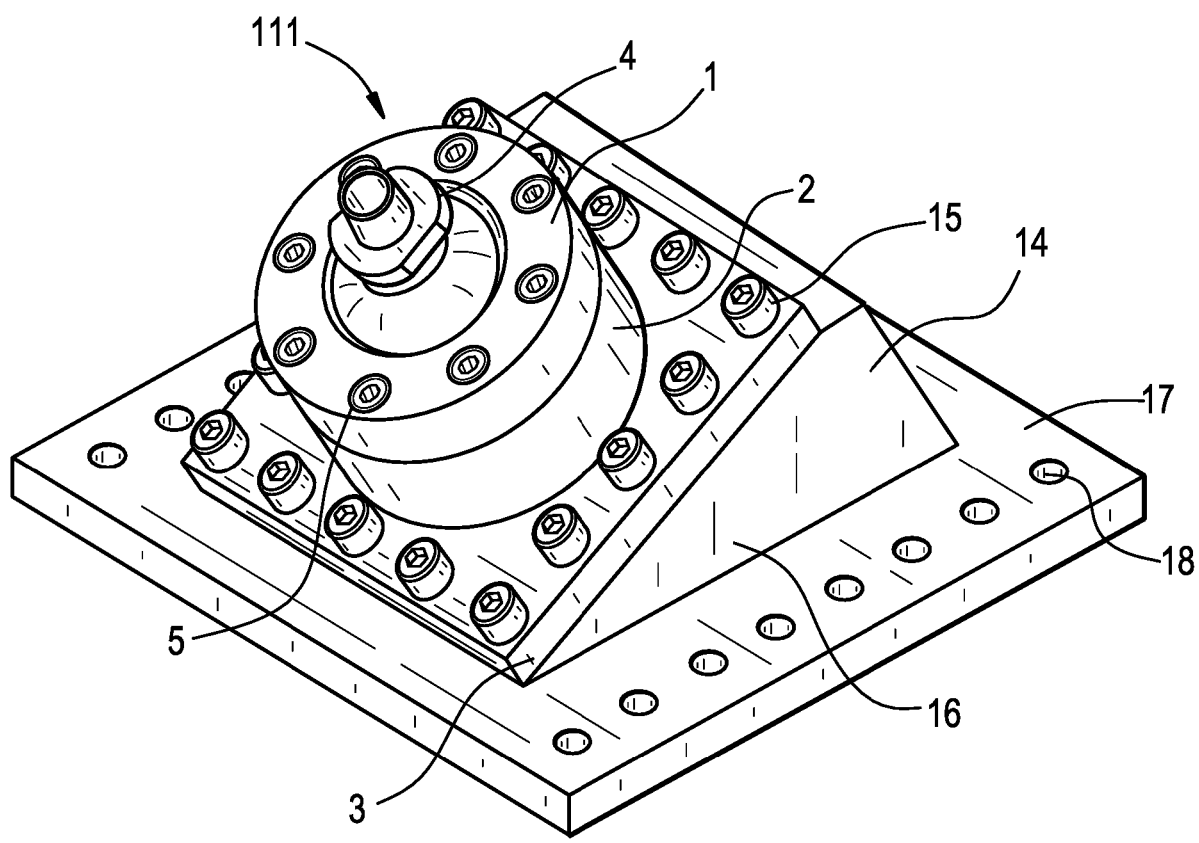
FIG. 3 is an isometric view of the spherical bearing assembly of FIG. 1 shown installed on a wedge assembly.

As shown in FIGS. 1 and 2, the first segment 1 has a plurality of alignment holes 1P extending axially into the first segment 1 from the first axial facing surface 1Y. In one embodiment, the alignment holes 1P are circumferentially symmetrically spaced apart from one another. The second segment 2 has a plurality of alignment holes 2P extending axially into the second segment 2 from the second axial facing surface 2Y. In one embodiment, the alignment holes 2P are circumferentially symmetrically spaced apart from one another. The alignment holes 1P are located in axial alignment with the alignment holes 2P. An alignment pin 6 is disposed in each of the alignment holes 1P and 2P to align the first segment 1 with the second segment 2.

Figure 7:
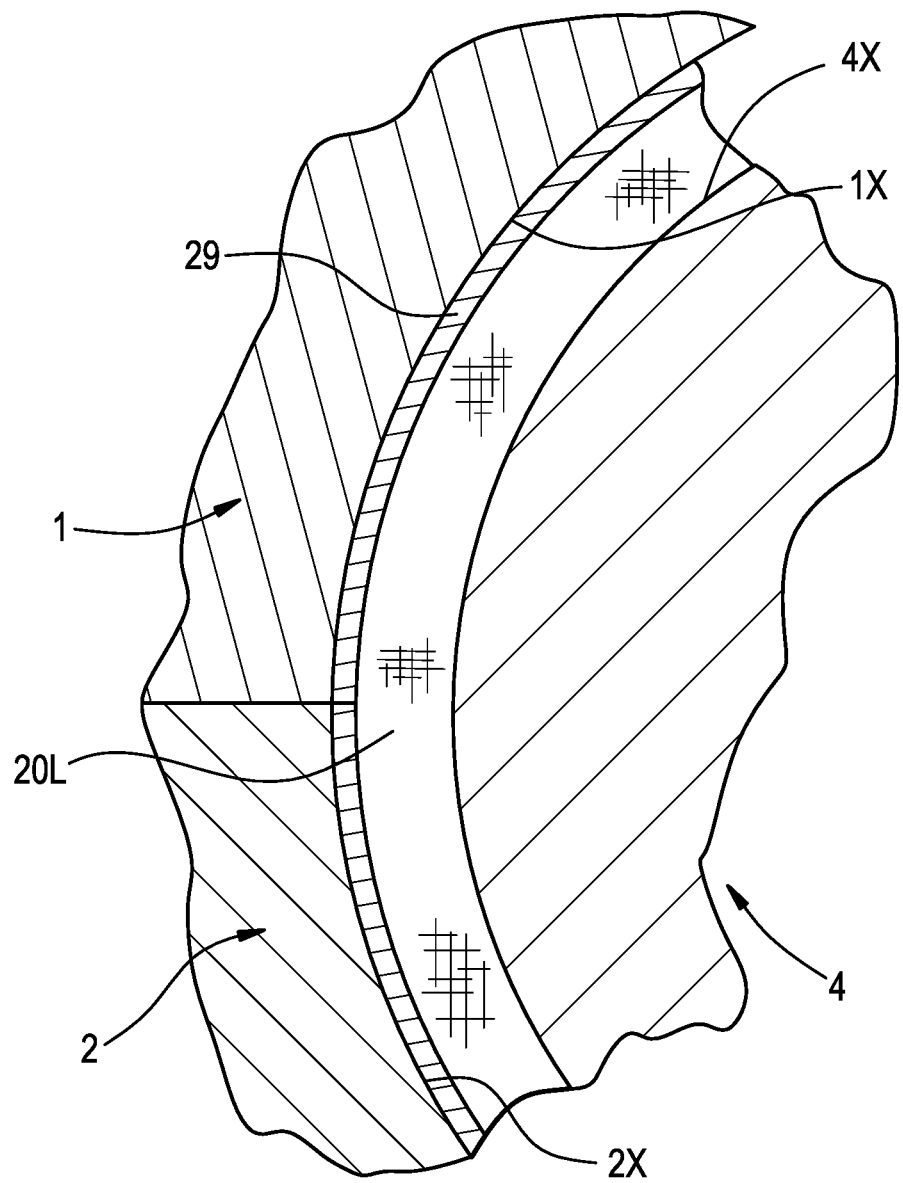
FIG. 7 is an enlarged cross-sectional view spherical bearing assembly of FIG. 1 showing the lubricious liner.

As shown in FIG. 7, a first portion of the lubricious liner 20L is attached to the first spherical interior surface 1X of the first segment 1 using a structural adhesive 29 such as, for example, an epoxy 29. A second portion of the lubricious liner 20L is attached to the second spherical interior surface 2X of the second segment 2 using a structural adhesive 29 such as, for example, an epoxy 29. A portion of the lubricious liner 20L fills a space between the first spherical interior surface 1X of the first segment 1 and the spherical exterior surface 4X of the ball 4A. A portion of the lubricious liner 20L fills a space between the second spherical interior surface 2X and spherical exterior surface 4X of the ball 4A. The lubricious liner 20L slidingly engages the spherical exterior surface 4X of the ball 4A, thus acting as a solid lubricant for efficient operation of the spherical bearing assembly 111. In one embodiment the first portion of the lubricious liner 20L and the second portion of lubricious liner 20L are spaced apart from one another forming a void therebetween. In one embodiment the first portion of the lubricious liner 20L and the second portion of lubricious liner 20L are spaced apart from one another by the spacer 59. In one embodiment the first portion of the lubricious liner 20L and the second portion of lubricious liner 20L are connected to one another.

In one embodiment, the lubricious liner 20L is a PTFE (polytetrafluoroethylene) in the form of powder, floc and/or fibers, woven fibers material such as, for example, Lubron TF-HTE woven fabric with polytetrafluoroethylene. The lubricious liner 20L has a predetermined thickness. In one embodiment, the lubricious liner is in a molded form. Thus, the lubricious liner 20L allows the bearing assembly 111 to operate under conditions of angular misalignment, high tensile loading, and high compression loading and to provide efficient damping in a tuned mass damper system.

The spherical bearing assembly 111 operates at speeds from about 0 to about 30 inches per second, accommodates movements from 0° to about ±30° in multiple rotation planes, and withstands bearing pressures between about 500 psi to about 10,000 psi. Speeds and loads of this magnitude can cause thermal spikes up to about 400° F., thus the lubricious liner 20L is designed to resist such high temperatures up to about 400° F. The lubricious liner 20L also allows for the bearing to accommodate the stresses due to significant misalignment, for example, misalignment in the range of from about 15 degrees to about 30 degrees.

Figure 4:
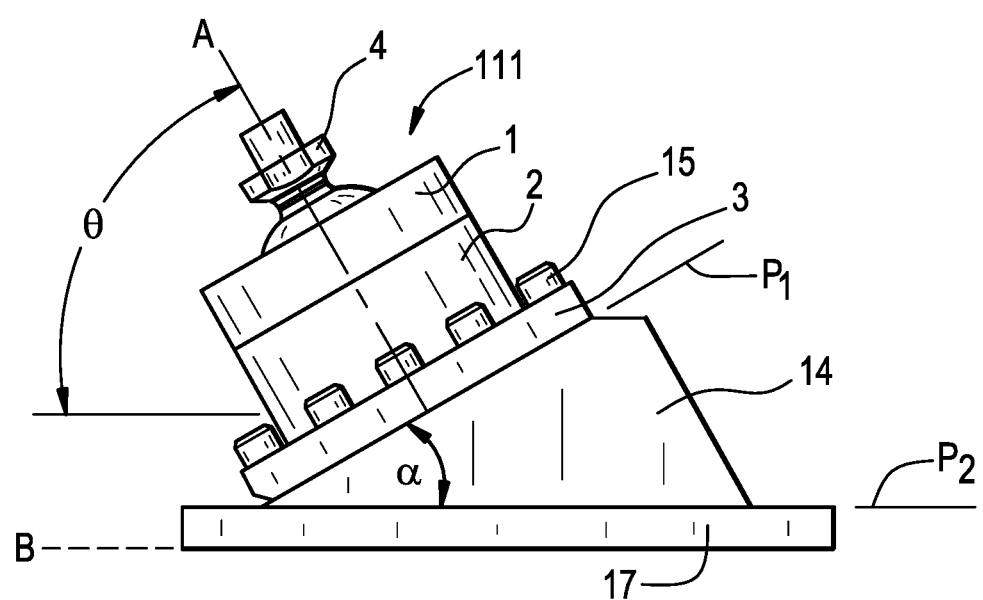
FIG. 4 is a side view of the spherical bearing assembly installed on the wedge assembly of FIG. 3.
Figure 5:
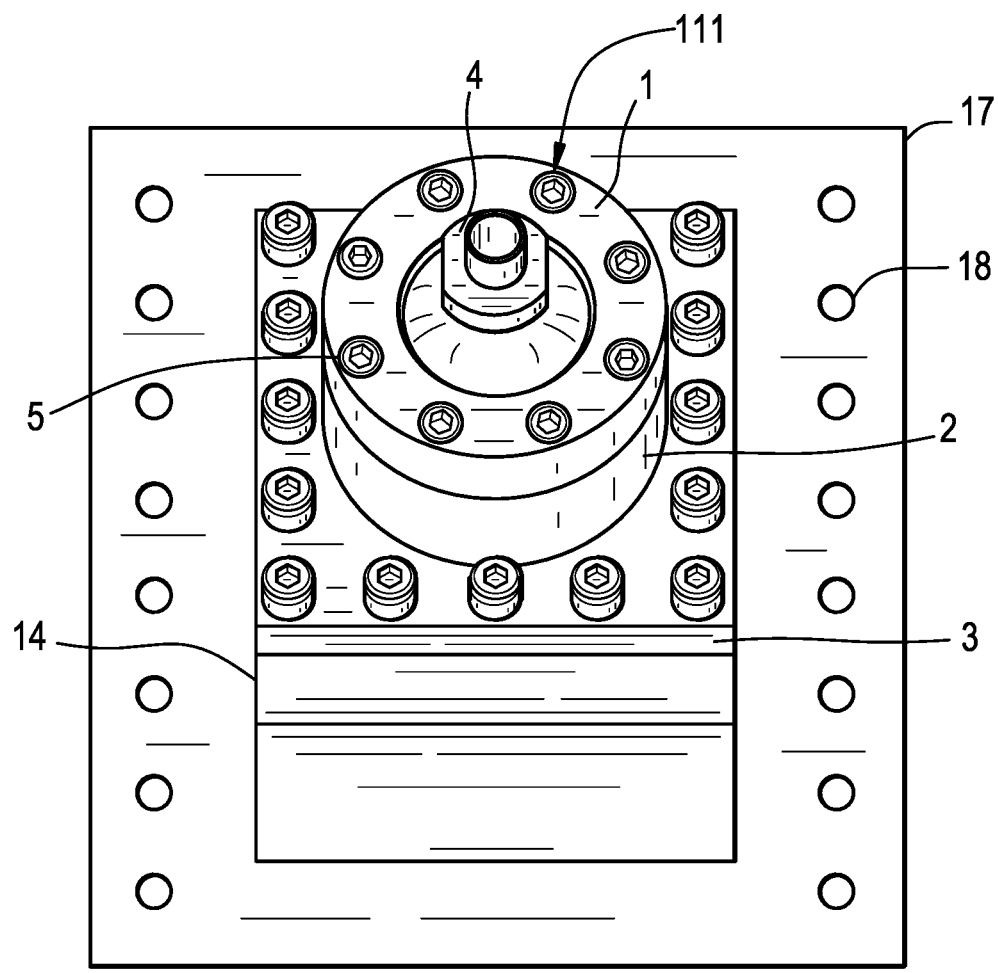
FIG. 5 is a top view of the spherical bearing assembly installed on the wedge assembly of FIG. 3.
Figure 6:
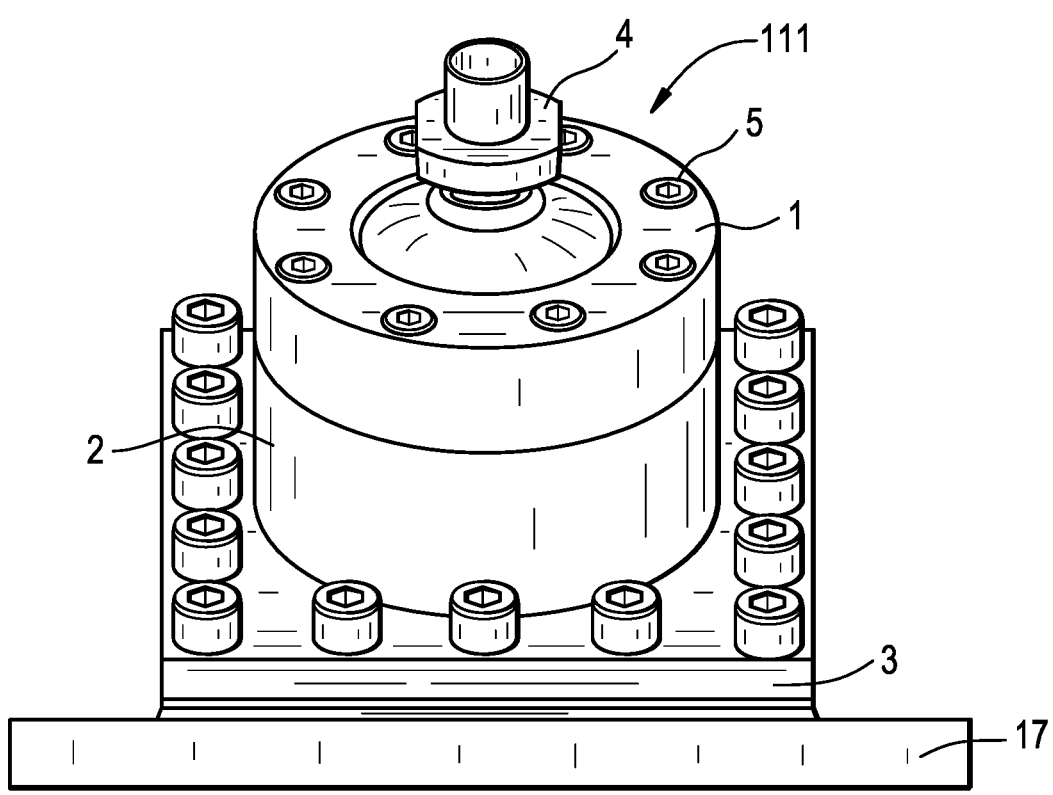
FIG. 6 is a front view of the spherical bearing assembly installed on the wedge assembly of FIG. 3.

As shown in FIGS. 1 and 2, the base 3 includes apertures 12 for connecting the base 3 to a wedge assembly 14 (see FIGS. 3-6) using fasteners 15. As shown in FIGS. 3-6, the wedge assembly 14 includes a tapered portion 16 and a mounting plate 17. As shown in FIG. 4, the wedge assembly 14 defines an angle α between a first plane P1 and a second plane P2. The tapered portion 16 is arranged to the base 3 so that the base 3 is tilted at the angle α, relative to the second plane at the angle α thereby forming an angle θ between the center axis A of the shaft 4C and axis B of the mounting plate 17 which is collinear with P2. In one embodiment, the angle α is about 30 degrees, and the angle θ is about 60 degrees. The mounting plate 17 includes apertures 18 for attaching the wedge assembly 14 and bearing assembly 111 to a portion of a tuned mass damper system connected to a building superstructure or foundation.

Figure 8:
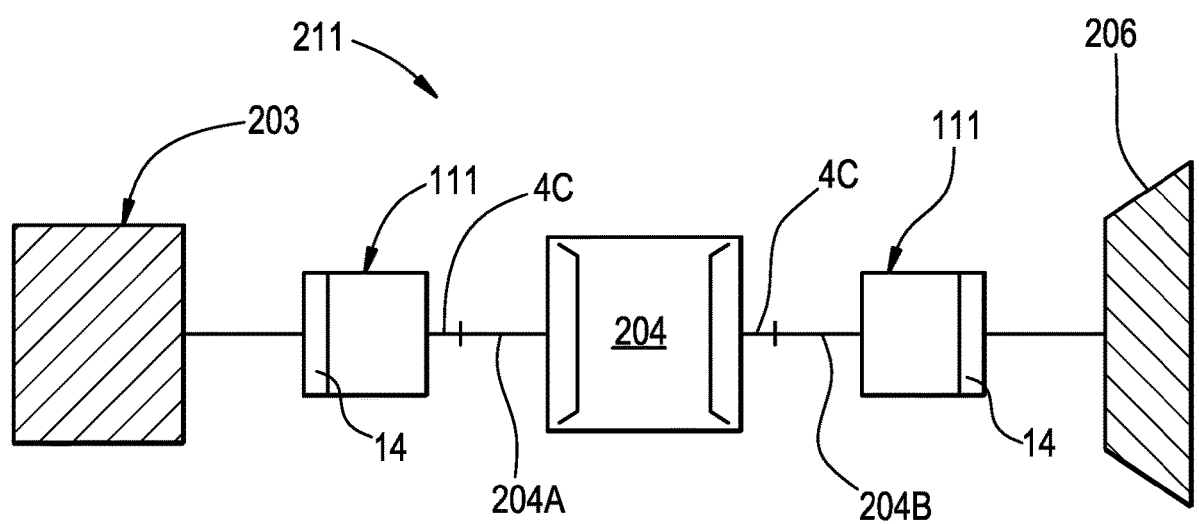
FIG. 8 is a side view of some of the elements of a tuned mass damper system using the spherical bearing assembly of FIG. 1.

As depicted in FIG. 8, in one non-limiting embodiment, a pair of the spherical bearing assemblies 111 are shown installed in a tuned mass damper system 211. Each of the spherical bearing assemblies 111 are attached on one end either directly or through the wedge assembly 14 and mounting plate 17 (See FIG. 3) to either a building structure 206 or a mass 203. The shaft 4C of the spherical bearing assembly 111 is directly fastened to a viscous damping device 204 (essentially a column of changing length that provides system damping; much like a shock absorber).

The tuned mass damper system 211 includes the viscous damping device 204 that has a first connector 204A and a second connector 204B. One of the spherical bearing assemblies 111 has the shaft 4C thereof connected to the first connector 204A. Another of the spherical bearing assemblies has the shaft 4C connected to the second connector 4B. In one embodiment, the wedge assembly 14 is in fixed relation to the second segment 2. For example, the wedge assembly 14 is secured to the base 3 or directly to a bottom portion of the second segment 2. The second segment 2 of one of the spherical bearing assemblies 111 is secured to the dampening mass 203 and the second segment 2 of another of the spherical bearing assemblies 111 is secured to the building structure 206.

While certain fasteners are shown and described throughout the disclosure, the present invention is not limited in this regard as other fasteners or systems for securing components may be employed.

Figure 9:
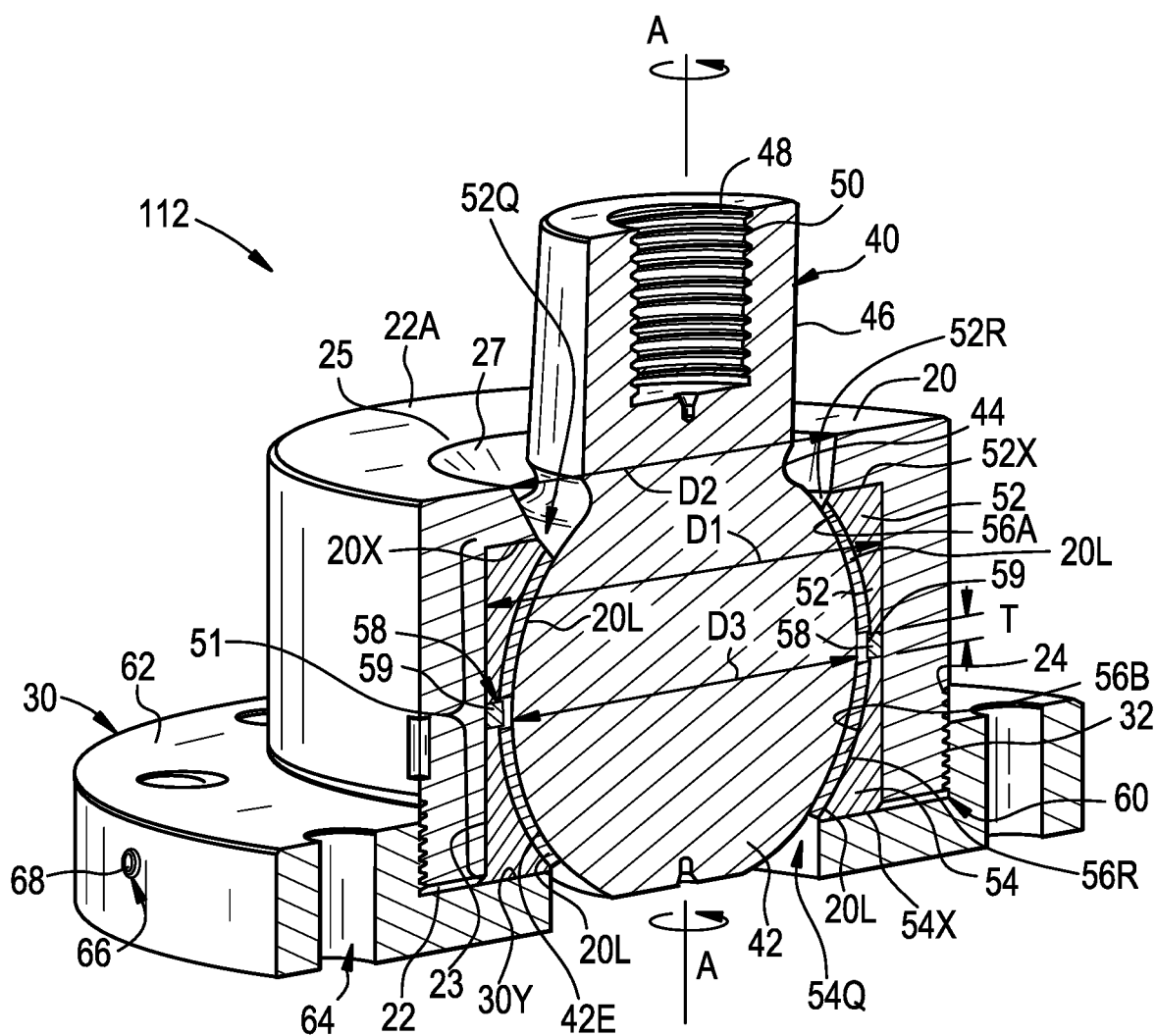
FIG. 9 depicts an isometric cross-sectional view of a clearance adjustable spherical bearing assembly according to one embodiment of the present disclosure.
Figure 10:
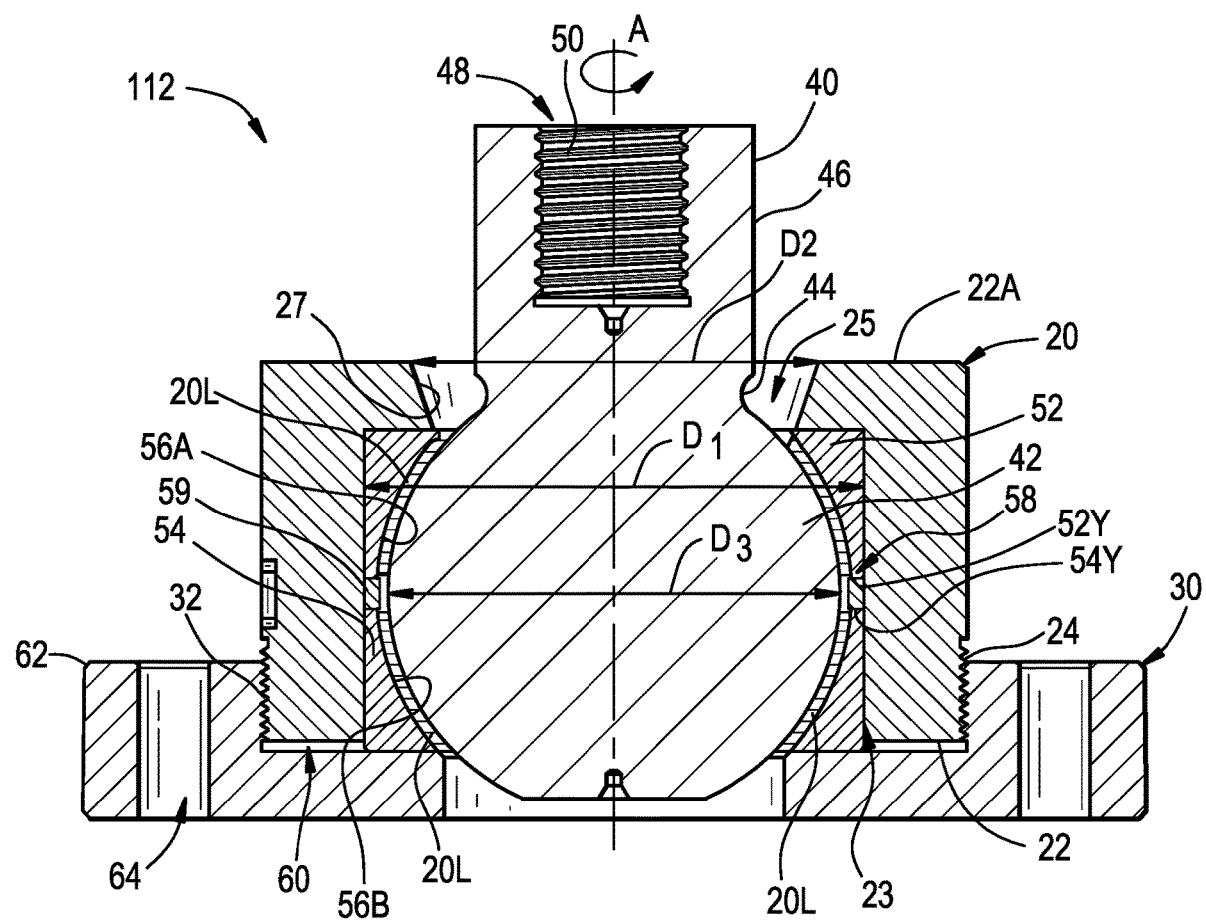
FIG. 10 depicts a cross-sectional view of the clearance adjustable spherical bearing assembly according to FIG. 9.

As shown in FIGS. 9 and 10, a clearance adjustable bearing for a damper assembly 600 (see FIG. 13) is generally designated with the numeral 112. The spherical bearing assembly 112 includes a ball 42 (e.g., a convex spherical portion) having a spherical exterior surface 42E and a shaft 46 (e.g., cylindrical portion) extending therefrom forming a rod end 40. The clearance adjustable bearing 112 includes an enclosure 51 (e.g., a retaining assembly). The enclosure 51 includes a first segment 52 (e.g., a first bearing ring) that has a first spherical interior surface 56A, a first axial abutment surface 52Y and a first axial facing opening 52Q. The first spherical interior surface 56A defines a first interior area 52R. The first axial facing opening 52Q extends into the first interior 52R. The enclosure 51 includes a second segment 54 (e.g., a second bearing ring) that has a second spherical interior surface 56B and a second axial abutment surface 54Y. The second spherical interior surface 56B defines a second interior area 56R. The second segment has an opening 54Q on an end thereof. A lubricious liner 20L is disposed between the enclosure 51 and the ball 42. The ball 42 is disposed in the first interior area 52R and the second interior area 56R with the shaft 46 extending out of the first axial opening 52Q. The first spherical interior surface 56A of the first segment 52 axially restrains the ball 42 from being pulled out through the first axial opening 52Q. A spacer 59 (e.g., an annular shim) is disposed in a gap 58 (e.g., an annular aperture or clearance) between the first axial abutment surface 52Y and the second axial abutment surface 54Y. The spacer 59 abuts the first axial abutment surface 52Y and the second axial abutment surface 54Y. The spherical bearing assembly 112 includes a clearance adjustment assembly that cooperates with the first segment 52 and the second segment 54. The clearance adjustment assembly is configured to selectively adjust forces applied to the spacer 59 by the first segment 52 and the second segment 54 to adjust clearance between the ball 42 and the enclosure 51.

The spherical bearing assembly 112 includes a housing 20 and a locking flange 30. The housing 20 removeably mates with the locking flange 30 around first segment 52 and the second segment 54 of the enclosure 51 and thereby around the ball 42. The housing 20 is cylindrical and centered on an axis A. The housing 20 extends from a first end 22 to a second end 22A. The first end 22 of the housing 20 defines a first aperture 23. The second end 22A defines a second aperture 25. The first aperture 23 and the second aperture 25 are circular and centered on axis A. The second aperture 25 defines a frustoconical surface 27 centered on axis A and the first aperture 23 defines a cylinder. The first aperture 23 has a diameter D1 that is larger in magnitude than a diameter D2 of the second aperture 25. The clearance adjustment system includes an external threaded portion 24 (e.g. a male thread) formed on a portion of the housing 20 proximate the first end 22 and an internal threaded portion 32 (e.g. a female thread) formed on the locking flange 30. The internal threaded portion 32 and the external threaded portion 24 selectively mate with one another in order to adjust the gap 58 between first axial abutment surface 52Y and the second axial abutment surface 54Y. The clearance adjustment system also includes the first segment 52 and the second segment 54 of the enclosure 51 which are disposed between the housing 20 and the locking flange 30. The first segment 52 and the second segment 54 are assembled over the ball 42 to form the gap 58 therebetween.

The ball 42 has a diameter D3 and a transition region 44 connects the ball 42 to the shaft 46. The frustoconical surface 27 allows for angular misalignment of the shaft 46 relative to the housing 20. In this embodiment, the shaft 46 includes an aperture 48 having a threaded region 50 which is symmetrical about axis A. The ratio of the diameter D3 to the diameter D1 (i.e., D3 divided by D1) is in the range of from about 0.83 to 0.95.

The lubricious liner 20L is secured (e.g. adhered, bonded, attached) to the concave spherical portions 56A, 56B of the first and second bearing rings 52, 54, respectively. However, the lubricious liner 20L can be secured (e.g. adhered, bonded, attached) to the ball 42. The lubricious liner 20L can be bonded using a structural adhesive, such as an epoxy 29 similar to that shown and described with reference to FIG. 7. The lubricious liner 20L is shaped to match the surface profile of first spherical interior surface 56A and the second spherical interior surface 56B. The lubricious liner 20L, which is formed in the general shape of a truncated sphere can be molded by for example, injection molding, compression molding and the like. The lubricious liner 20L is in sliding engagement with the ball 42.

The first segment 52 and the second segment 54 are assembled such that there is the gap 58 formed between the first segment 52 and the second segment 54. The gap 58 extends continuously around the diameter D3 of the ball 42 and proximate to the midpoint of the ball 42. Thus, the clearance adjustment system includes the external threaded portion 24 of the housing 20, the internal threaded portion 32 of the locking flange 30, gap 58 and the spacer 59, which cooperate with one another to selectively adjust clearance between the ball 42 and the enclosure 51.

In one embodiment, the spacer 59 is a ShimPack® type shim. The spacer 59 defines a rectangular cross section. The gap 58 and the spacer 59 are further elements of the clearance adjustment system. The spacer 59 can have a predetermined thickness T that is established to provide a designed fit of the ball 42 in the enclosure 51. The thickness T can be adjusted for specific design needs. For example, an axially thicker shim will provide a looser fit than an axially thinner shim. Although one shim 59 is shown herein, more than one shim can be employed. It is further contemplated that other shim geometries may be employed. The function of the shim is: (1) to preload the threads to eliminate clearance regardless of wear; (2) to prevent movement of the first segment 52 and the second segment 54 in the housing 20 after wear; and (3) to create good conformity between the ball 42 and the enclosure 51. For example, as shown in FIG. 9, the shim 59 prevents the first segment 52 and second segment 54 from moving by maintaining a clamping force on and between an axial face 52X of the first segment 52 and an abutment surface 20X of the housing 20 and between an axial face 54X of the second segment 54 and an abutment surface 30Y of the locking flange 30. Without the shim 59, after wear, the first segment 52 and the second segment 54 could potentially move around in the housing 20.

A gap 60 is provided between the first end 22 of the housing 20 and the abutment surface 30Y of the flange 30 to prevent the housing 20 from bottoming out on the abutment surface 30Y before the spacer 59 is adequately compressed between the first segment 52 and the second segment 54. The locking flange 30 includes an outer flanged portion 62. The outer flanged portion 62 includes spaced apart apertures 64 to facilitate connection of the locking flange 30 to a structure, for example with fasteners. The outer flanged portion 62 also includes at least one radially extending threaded aperture 66 (threads not shown) for engaging an anti-rotation device 68 (e.g., a set or locking screw). In this way, the anti-rotation device 68 can be inserted in the aperture 66 and tightened to engage and lock the external threaded portion 24 of the housing 20 with the internal threaded portion 32 of the locking flange 30, thus securing the housing 20 to the locking flange 30 in a range of adjustable positions. The anti-rotation 68 device is configured to engage the locking flange 30 and the housing 20 to prevent relative rotation therebetween. The anti-rotation device 68 allows for adjustment of the spacing between the first segment 52 and the second segment 54 and stabilization thereof. By immobilizing the threaded connection, tolerance stack ups can be eliminated, thereby forming a highly efficient spherical bearing assembly 112. More than one anti-rotation device 68 can be used to counteract forces tending cause movement of the threaded connection. In one embodiment, a cup point set screw is employed as the anti-rotation device 68 provided by the external threaded portion 24 and the internal threaded portion 34. The anti-rotation device 68 immobilizes the threaded connection to retain the housing 20 in place relative to the locking flange 30.

Figure 11:
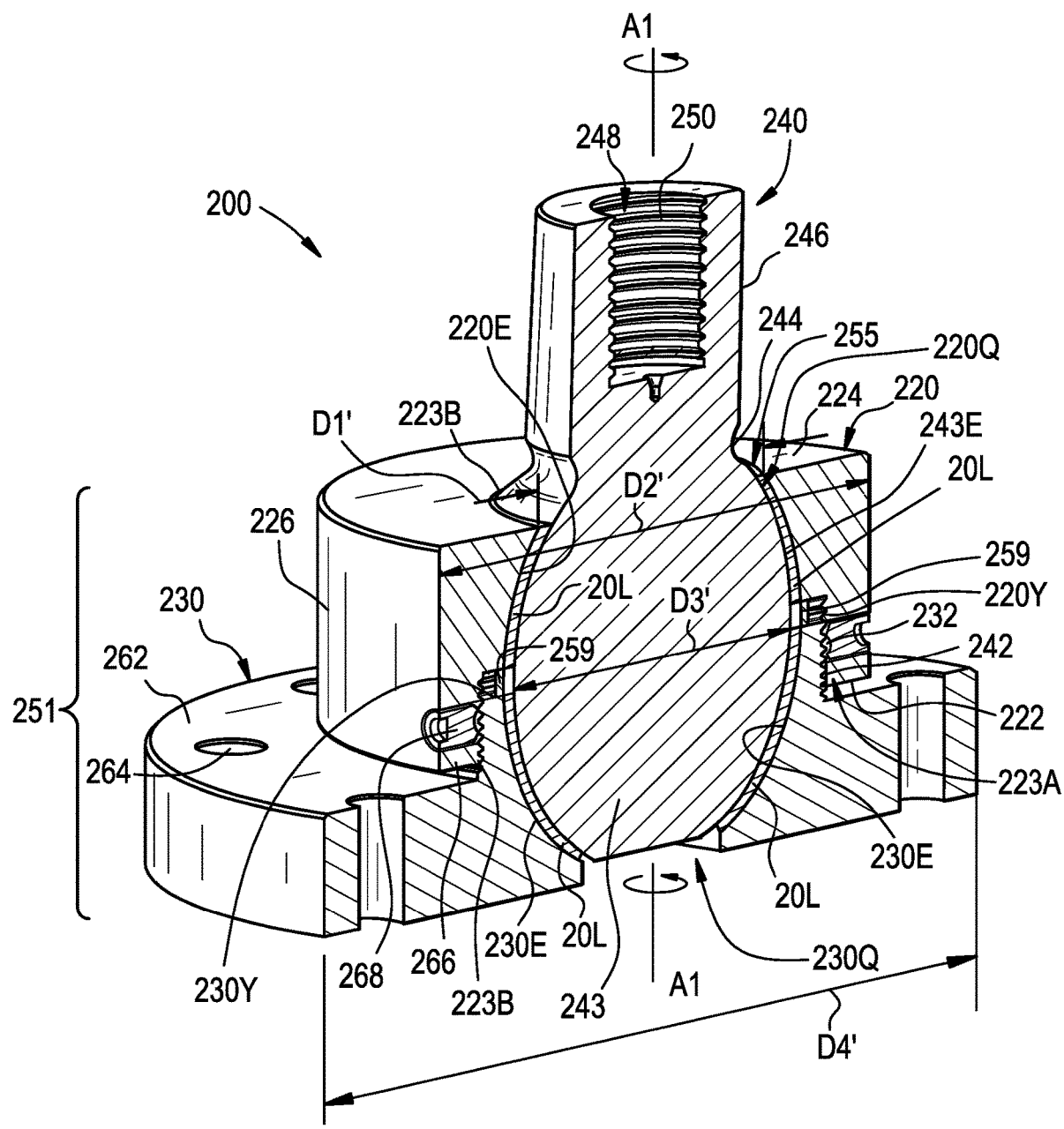
FIG. 11 depicts an isometric cross-sectional view of another embodiment of a clearance adjustable spherical bearing assembly according to the present disclosure.
Figure 12:
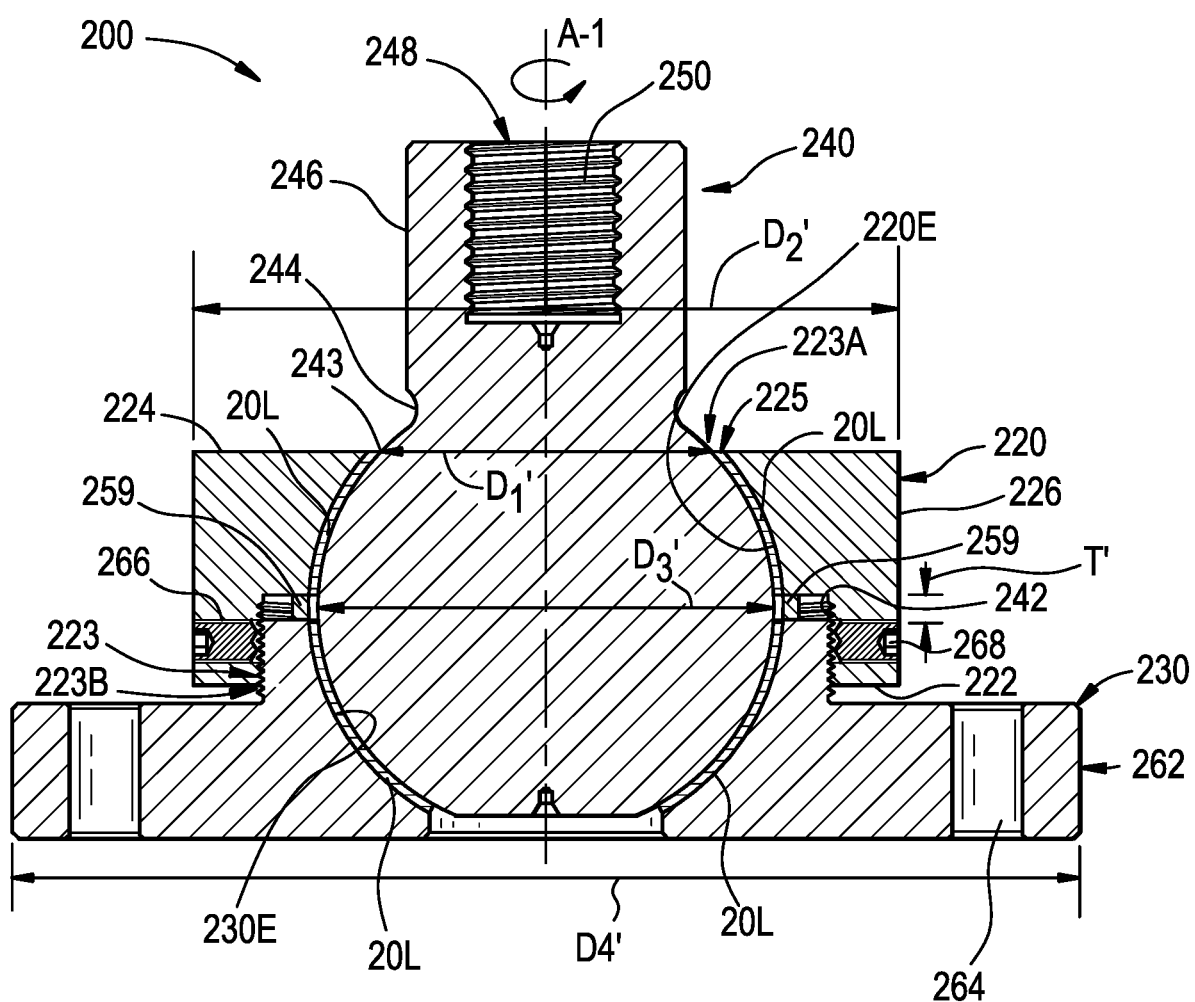
FIG. 12 depicts a cross-sectional view of the clearance adjustable spherical bearing assembly according to FIG. 11.

Referring to FIGS. 11 and 12, another embodiment of a clearance adjustable spherical bearing assembly is generally designated by the numeral 200. The spherical bearing assembly 200 includes a ball 243 having a spherical exterior surface 243E and a shaft 246 (e.g., a cylindrical portion) extending therefrom forming a rod end 240. The spherical bearing assembly 200 includes an enclosure 251 for retaining the ball 243 therein. The enclosure 251 includes a first segment 220 (e.g., a first housing portion) that has a first spherical interior surface 220E, a first axial abutment surface 220Y and a first axial facing opening 255. The first spherical interior surface 220E defines a first interior area 220Q. The first axial facing opening 255 extends into the first interior 220Q. The spherical bearing assembly 200 includes a second segment 230 (e.g., a locking flange) that has a second spherical interior surface 230E and a second axial abutment surface 230Y. The second spherical interior surface 230E defines a second interior area 230Q. The spherical bearing assembly 200 includes a lubricious liner 20L disposed between the enclosure 251 and the ball 243. The ball 243 is disposed in the first interior area 220Q and the second interior area 230Q with the shaft 246 extending out of the first axial opening 255. The first spherical interior surface 220E of the first segment 220 axially restrains the ball 243 from being pulled out through the first axial opening 255. The spherical bearing assembly 200 includes a spacer 259 disposed between the first axial abutment surface 220Y and the second axial abutment surface 230Y. The spacer 259 abuts the first axial abutment surface 220Y and the second axial abutment surface 230Y. The spherical bearing assembly 200 includes a clearance adjustment assembly cooperating with the first segment 220 and the second segment 230. The clearance adjustment assembly is configured to selectively adjust forces applied to the spacer 259 by the first segment 220 and the second segment 230 to adjust clearance between the ball 243 and the enclosure 251.

As shown in FIGS. 11 and 12, the first segment 220 removeably mates with the second segment 230 around the ball 243. The first segment 220 is cylindrical and centered on axis A1. The first segment 220 extends from a first end 222 to a second end 224. The first end 222 defines a first aperture 223A which is centered on axis A1. The second end 224 defines a second aperture 223B which is centered on axis A1. The first segment 220 includes an interior cylindrical portion 223B which has an internal threaded region 242. The second aperture 223B is cylindrical, extends circumferentially around the shaft 246 and defines a cylinder having a diameter D1' centered on the axis A1.

In one embodiment, the spacer 259 is a ShimPack® type shim. The spacer 259 defines a rectangular cross section. The spacer 259 is a further element of the clearance adjustment system. The spacer 259 has a predetermined axial thickness T', that is established to provide a designed fit of the ball 243 in the enclosure 251. The thickness T' can be adjusted for specific design needs. For example, an axially thicker spacer will provide a looser fit than an axially thinner spacer. Although one spacer 259 is shown herein, more than one spacer can be employed. It is further contemplated that other geometries for the spacer 259 may be employed.

The first segment 220 has a cylindrical exterior surface 226 that defines a diameter D2'. The internal threaded region 242 of the first segment 220 mates with an external threaded portion 232 of the second segment 230.

The ball 243 has a diameter D3'. A transition region 244 connects the ball 243 to shaft 246. In one embodiment, the cylindrical portion 246 includes an aperture 248 having a threaded region 250 which is symmetrical about axis A1. The ratio of the diameter D3' to the diameter D1' is in the range of from about 0.72 to about 0.88. The ratio of the diameter D2' to D3' is in the range of from about 1.39 to about 1.69.

The first segment 220 also includes two or more radially extending threaded apertures 266 (threads not shown) for engaging an anti-rotation device 268 (e.g., set or locking screws). In this way, the anti-rotation device 268 can be inserted in the aperture 266 and tightened to engage and lock the internal threaded portion 242 of the first segment 220 with the external threaded portion 232 of the second segment 220 thus securing the first segment 220 to the second segment 230 thus allowing for adjustment of the spacing between the first segment 220 and the second segment 230 and stabilization thereof. Two or more anti-rotation devices 268 may be used to counteract forces tending to cause movement of the threaded connection provided by the external threaded portion 232 and the internal threaded portion 242.

The second spherical interior surface 230E of the second segment 230 conforms in shape to the spherical exterior surface 243E of the ball 243. The second segment 230 has an external threaded portion 232 adapted to form a threaded connection with the internal threaded portion 242 the first segment 220. The second segment 230 has a cylindrical flanged outer portion 262. The outer portion 262 includes spaced apart apertures 264 to facilitate connection of the second segment 220 to a structure, for example with fasteners. The outer portion 262 of the second segment 220 defines a diameter D4'.

Thus, the clearance adjustment system includes the internal threaded region 242 of the first segment 220, the external threaded portion 232 of the second segment 220 and the spacer 259, which cooperate with one another to selectively adjust clearance between the ball 243 and the enclosure 251.

A first segment of the lubricious liner 20L is secured (e.g. adhered, bonded, attached) to the first spherical interior surface 220E of the first segment 220. A second segment of the lubricious liner 20L is secured (e.g. adhered, bonded, attached) to the second spherical interior surface 230E of the second segment 230. In one embodiment, the lubricious liner 20L is bonded using a structural adhesive, such as an epoxy 29 similar to that shown and described with reference to FIG. 7. The lubricious liner 20L is shaped to match the surface profile of the first spherical interior surface 220E of the first segment 220, the surface profile of the second spherical interior surface 230E of the second segment 230 and the spherical exterior surface 243E of the ball 243. The lubricious liner 20L, which is formed in the general shape of a truncated sphere, can be molded by for example, injection molding, compression molding and the like. The lubricious liner 20L slidingly engages the spherical exterior surface 243E of the ball 243.

In one embodiment, the lubricious liner 20L is a PTFE (polytetrafluoroethylene) woven material such as, for example, Lubron TF-HTE woven PTFE fabric. The lubricious liner 20L is configured to lubricate the interface surfaces such as the spherical exterior surface 243E of the ball 243, thus allowing the bearing 111, 112, 200 to operate under conditions of misalignment, high tensile loading, and high compression loading in order to provide a low wear, durable, and reliable joint.

Figure 13:
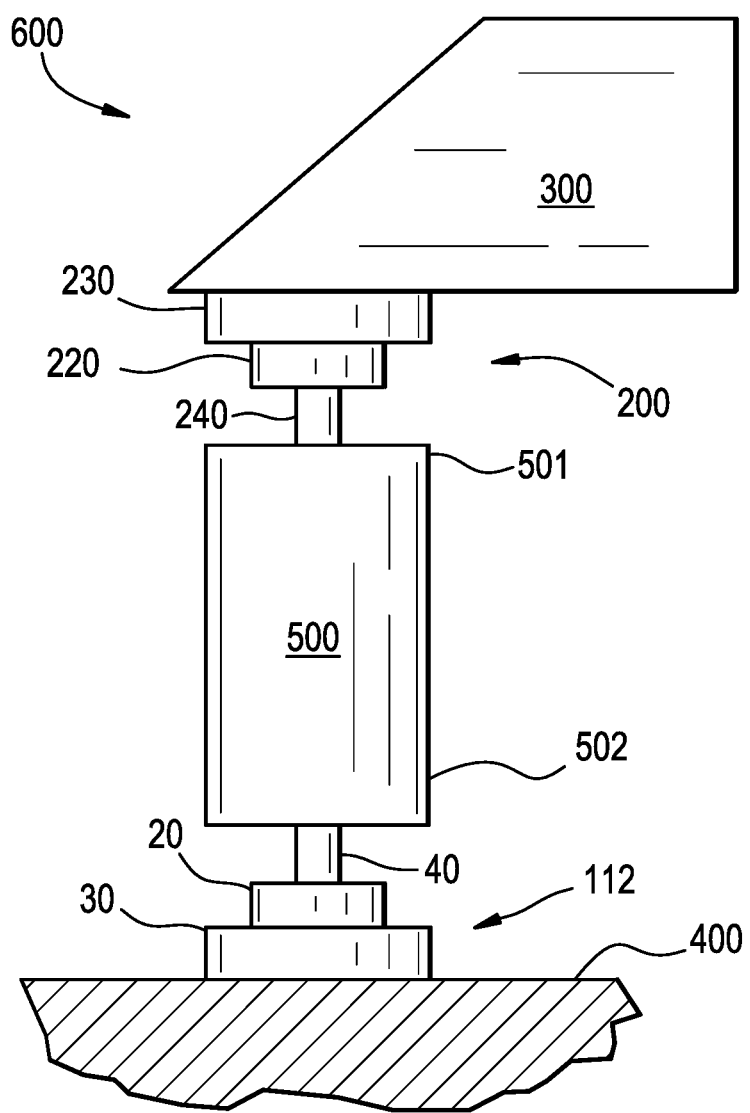
FIG. 13 depicts a cross-sectional view of the clearance adjustable spherical bearing of FIGS. 9-12 as used in a damper system.

As shown in FIG. 13, the clearance adjustable spherical bearings 112, 200 are shown installed in a damper system 600. In this example, the rod end 240 of the spherical bearing assembly 200 is attached to a first end 501 of a mass damping device 500; and the rod end 40 of the clearance adjustable spherical bearing 112 is attached to a second end 502 of the mass damping device 500. The mass damping device 500 can be a dry friction, solid, viscous or any other type of known damper. The second segment 230 of the spherical bearing assembly 200 is attached to, for example, a movable structure 300 such as a building component; the locking flange 30 of the spherical bearing assembly 112 is attached to a non-movable structure 400 such as a building foundation. Of course, other configurations of clearance adjustable spherical bearings, dampers, and structures are contemplated as the clearance adjustable spherical bearings disclosed herein are versatile and may be used in any appropriate manner to control the stack up tolerances of a damper system. For example, other configurations include, but are not limited to, the locking flanges 30, 230 being connected to the mass damping device 500 and the rod ends 40, 240 being connected to the movable structure 300 or the non-movable structure 400.

In some embodiments, the lubricious liner 20L includes a plurality of lubricating fibers in a support system (e.g. a matrix). In one particular embodiment, the support system defines a plurality of support fibers and a resin system infused between and encapsulating the support fibers and the lubricating fibers. In one embodiment, the plurality of lubricating fibers is manufactured from a polytetrafluoroethylene (PTFE) material, a nylon, and/or a graphite. In one embodiment, the plurality of support fibers is manufactured from fiberglass, polyethylene terephthalate (sometimes written poly (ethylene terephthalate)), commonly abbreviated PET, PETE (Dacron®)), polyester, cotton, a meta-aramid material (e.g., Nomex®), and/or a para-aramid synthetic material (e.g., Kevlar®). In one embodiment, the resin system includes polyester, epoxy, phenolic, urethane, polyimide and/or polyamide. In one embodiment, the support system includes a filler in a composite resin system including polyester, epoxy, phenolic, urethane, polyimide and/or polyamide. In one embodiment, the filler comprises fiberglass, graphite, bronze, molybdenum disulfide and/or carbon fiber.

Exemplary material compositions of the componentry include but are not limited as follows. The balls 4, 42, 243 are manufactured from an SAE 4340 steel per AMS 6415, HRc 39-43 with chrome plated transition regions (e.g., necks) 44 & 244 or corrosion resistant alloys such as 17-4PJ stainless steel, type 316, 304 or 440c stainless steel. In one embodiment, the first spherical interior surface 56A, second spherical interior surface 56B, first spherical interior surface 220E, second spherical interior surface 230E and the spherical exterior surface 243E are chrome plated. In one embodiment, the first segment 52, 220 and the second segment 54, 230 are thru-hardened SAE 52100 steel, HRc 56-62. In one embodiment the spacer 59 is made of steel shim stock stacks of a thickness as low as 0.0002". In one embodiment, the first segment 20, 220, and the second segment 30, 230 are manufactured from SAE 1040 or 1045 steel, Bhn 160 min. In one embodiment the anti-rotation devices 68, 268 are manufactured from a steel alloy, including but not limited to ASTM A36, A709 and A564.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A spherical bearing assembly for a damper assembly, the spherical bearing assembly comprising:
    a ball having a spherical exterior surface and a shaft extending therefrom;
    an enclosure comprising:
        (a) a first segment having a first spherical interior surface, a first axial abutment surface and an axial facing opening, the first spherical interior surface defining a first interior area, the axial facing opening extending into the first interior area; and
        (b) a second segment having a second spherical interior surface and a second axial abutment surface, the second spherical interior surface defining a second interior area;
    a lubricious liner disposed between the enclosure and the ball;
    fasteners configured to fasten the first segment to the second segment; and
    alignment pins configured to align the first segment with the second segment,
    wherein the ball is disposed in the first interior area and the second interior area, and the shaft extends out of the opening.

2. The spherical bearing assembly of claim 1, wherein the second segment is removably secured to the first segment with the first axial facing surface abutting the second axial facing surface, such that the first spherical interior surface of the first segment axially restrains the ball from being pulled out through the opening.

3. The spherical bearing assembly of claim 1, wherein the lubricious liner comprises woven fibers with PTFE in the form of at least one of powder, floc and fibers.

4. The spherical bearing assembly of claim 1, wherein the lubricious liner is bonded to at least one of a portion of the first spherical interior surface and a portion of the second spherical interior surface.

5. The spherical bearing assembly of claim 1, wherein a plurality of first holes extends axially inward from the first axial abutment surface, a plurality of second holes extends axially inward from the second axial abutment surface, the plurality of first holes are axially aligned with the plurality of second holes, and each of the alignment pins extends into a respective first hole of the plurality of first holes and a respective second hole of the plurality of second holes.

6. The spherical bearing assembly of claim 1, further comprising a base secured to the second segment.

7. A tuned mass damper system comprising:
    a viscous damping device having a first connector and a second connector;
    a first spherical bearing assembly of claim 1, wherein the shaft of the first spherical bearing assembly is connected to the first connector; and
    a second spherical bearing assembly of claim 1, wherein the shaft of the second spherical bearing assembly is connected to the second connector.

8. The tuned mass damper system of claim 7, further comprising a wedge assembly in fixed relation to the second segment.

9. The tuned mass damper system of claim 7, wherein the second segment of the first spherical bearing assembly is secured to a dampening mass and the second segment of the second spherical bearing assembly is secured to a building structure.

10. The spherical bearing assembly of claim 1, further comprising:
    a spacer disposed between the first axial abutment surface and the second axial abutment surface, the spacer abutting the first axial abutment surface and the second axial abutment surface; and
    a clearance adjustment assembly cooperating with the first segment and the second segment, the clearance adjustment assembly being configured to selectively adjust forces applied to the spacer by the first segment and the second segment to adjust clearance between the ball and the enclosure.

11. The spherical bearing assembly of claim 10, wherein the clearance adjustment assembly comprises a threaded engagement between the first segment and the second segment.

12. The spherical bearing assembly of claim 10, wherein the first segment and the second segment are axially retained between a housing and a locking flange.

13. The spherical bearing assembly of claim 10, wherein the spacer is compressed between the first axial abutment surface and the second axial abutment surface by threadably torqueing a housing to a locking flange.

14. The spherical bearing assembly of claim 10, further comprising an anti-rotation device configured to engage a locking flange and a housing to prevent relative rotation therebetween.

15. The spherical bearing assembly of claim 1, wherein the fasteners comprise bolts.

16. The spherical bearing assembly of claim 15, wherein first bores extend through the first segment, second bores extend through the second segment, and each of the bolts extends into a respective first bore of the first bores and a respective second bore of the second bores.

17. A spherical bearing assembly for a damper assembly, the spherical bearing assembly comprising:
 a ball having a spherical exterior surface and a shaft extending therefrom;
 an enclosure comprising:
  (a) a first segment having a first spherical interior surface, a first axial abutment surface and an axial facing opening, the first spherical interior surface defining a first interior area, the axial facing opening extending into the first interior area; and
  (b) a second segment having a second spherical interior surface and a second axial abutment surface, the second spherical interior surface defining a second interior area; and
 a lubricious liner disposed between the enclosure and the ball,
 wherein the ball is disposed in the first interior area and the second interior area, and the shaft extends out of the opening,
 wherein the second segment is removably secured to the first segment with the first axial facing surface abutting the second axial facing surface, such that the first spherical interior surface of the first segment axially restrains the ball from being pulled out through the opening, and
 wherein the lubricious liner is bonded to at least one of a portion of the first spherical interior surface and a portion of the second spherical interior surface.

* * * * *